United States Patent [19]

Kim et al.

[11] 4,343,635
[45] Aug. 10, 1982

[54] GLASS FIBER-FORMING APPARATUS

[75] Inventors: Kwan Y. Kim, Pickerington; Clarence E. Fracker, Frazeyburg, both of Ohio

[73] Assignee: Owens-Corning Fiberglas Corporation, Toledo, Ohio

[21] Appl. No.: 221,113

[22] Filed: Dec. 29, 1980

[51] Int. Cl.³ .................................. C03B 37/025
[52] U.S. Cl. ................................. 65/1; 65/12
[58] Field of Search ........................... 65/1, 2, 12

[56] References Cited

U.S. PATENT DOCUMENTS

| 3,574,581 | 4/1971 | Strickland et al. | 65/1 |
| 3,979,195 | 9/1976 | Strickland | 65/1 |
| 4,032,314 | 6/1977 | Coggin | 65/1 |

FOREIGN PATENT DOCUMENTS 2021092 11/1979 United Kingdom .

Primary Examiner—Robert L. Lindsay, Jr.
Attorney, Agent, or Firm—Ronald C. Hudgens; Philip R. Cloutier; Kenneth H. Wetmore

[57] ABSTRACT

The invention relates to apparatus for producing fibers from heat softened mineral material, such as glass. More specifically, this invention relates to an orifice plate for a glass fiber drawing bushing of the type having a flat undersurface and a plurality of orifices formed therethrough with the improvement comprising at least two sets of grooves formed on said undersurface, said grooves extending in intersecting relationship to divide said undersurface into a plurality of sections, said orifices being located within said sections. The grooves can have a width in the range of from aout 0.1 mm to about 1.2 mm and a depth in the range of from about 0.1 mm to about 0.5 mm. The orifice plate can comprise rod members at the intersections of the grooves with said rod members projecting beneath said grooves.

9 Claims, 9 Drawing Figures

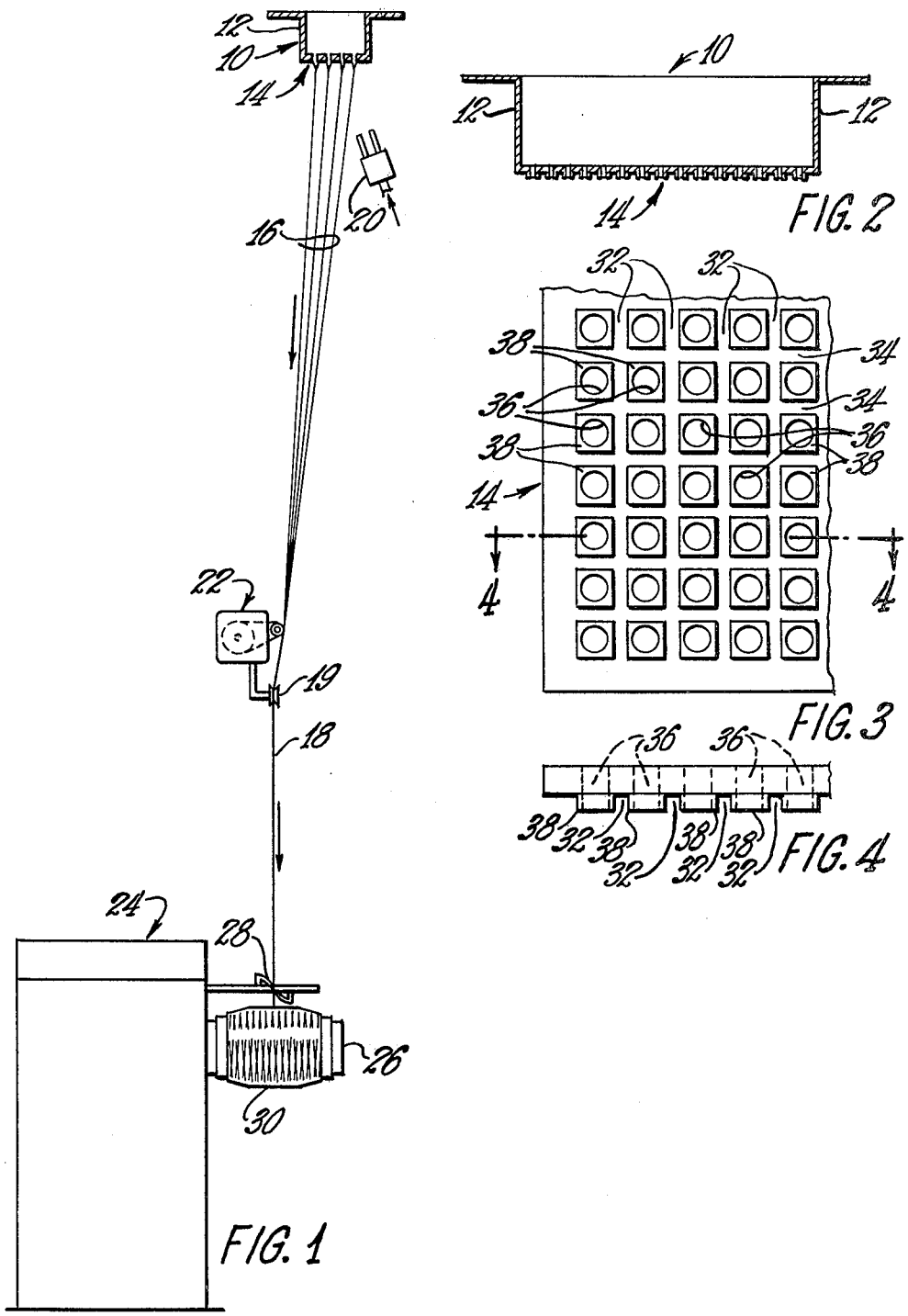

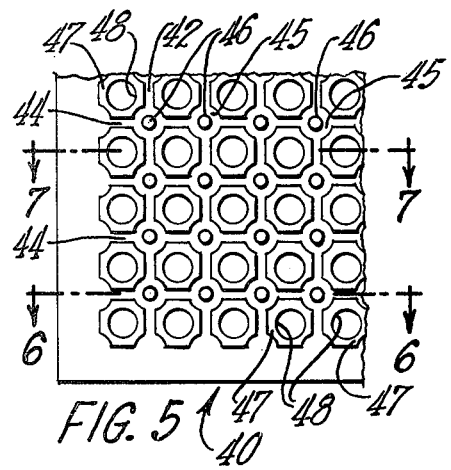
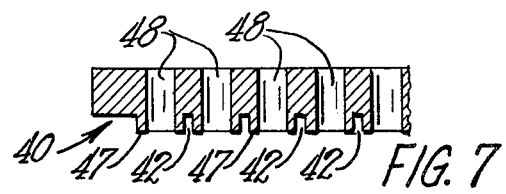
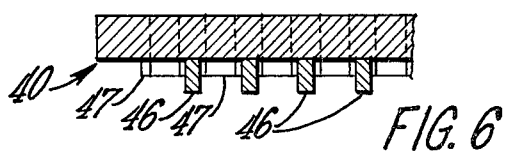
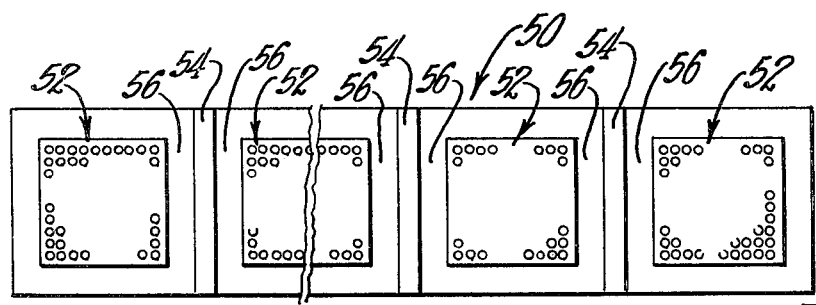
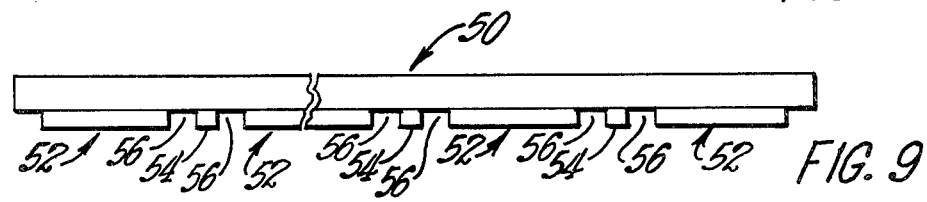

GLASS FIBER-FORMING APPARATUS

TECHNICAL FIELD

The invention relates to apparatus for the production of fibers from heat softened mineral material, such as glass. More specifically, this invention relates to apparatus for the production of glass fibers using a tipless glass fiber forming, or drawing, bushing, that is, a bushing having a generally flat undersurface, or bottom wall. The apparatus comprises grooves in the undersurface of the bushing between the orifices to resist flooding of the molten glass material along the undersurface of the bushing.

BACKGROUND OF ART

It has been conventional in the glass fiber forming art to use bushings that have orificed projections to flow streams of molten glass material for attenuation into fibers. By using such orificed projections, the undersurface or bottom wall of such bushings is less likely to flood with molten glass material during an interruption of the fiber forming process. During an interruption of the process, the exiting glass of a tipped bushing will generally form beads at the exit of each tip rather than flood across the bottom wall to form a large mass of glass covering the undersurface of the bushing.

However, by using bushings which include tips or orifices projections, one is physically limited by the walls of the tips to certain maximum orifice densities in the bottom wall. If the tips or projections can be eliminated from the bottom surface of the bushing, the orifices can be packed more closely together, and thus, higher orifice density bushings can be utilized.

The use of tipless bushings, i.e., bushings having a generally flat undersurface, is described in U.S. Pat. No. 3,905,790 and in British Pat. No. 1,498,184.

However, utilization of such high orifice density tipless bushings has been limited because of the difficulty in running such bushings and in restarting such bushings after an interruption. Improved apparatus is desired for the production of glass fibers through tipless bushings.

SUMMARY OF THE INVENTION

The present invention comprises an orifice plate for a glass fiber drawing bushing of the type having a flat undersurface and a plurality of orifices formed therethrough, the improvement comprising at least two sets of grooves formed on said undersurface, said grooves having a width in the range of from about 0.1 mm to about 1.2 mm and a depth in the range of from about 0.1 mm to about 0.5 mm and extending in intersecting relationship to divide said undersurface into a plurality of sections, said orifices being located within said sections.

The present invention comprises an orifice plate for a glass fiber drawing bushing of the type in which said orifice plate has a flat undersurface and a large number of orifices so closely arranged that molten glass cones produced at adjacent orifices coalesce to cause flooding over said undersurface and cooling air is required to be blown against said undersurface of the orifice plate to prevent flooding, the improvement comprising at least two sets of parallel grooves formed on said undersurface, said sets of grooves having a width in the range of from about 0.1 mm to about 1.2 mm and a depth in the range of from about 0.1 mm to about 0.5 mm and extending in intersecting relationship to divide said undersurface into a plurality of sections, said orifices being located within said sections.

The present invention comprising an orifice plate for a glass fiber drawing bushing of the type having a flat undersurface and a plurality of orifices formed therethrough, the improvement comprising at least two sets of grooves formed on said undersurface, said sets of grooves positioned in intersecting relationship to divide said undersurface into a plurality of sections, said orifices being located within said sections and rod members at the intersections of the grooves, said rod members projecting beneath said grooves.

An object of the invention is to provide an improved apparatus for the production of glass fibers.

Another object of the invention is to provide an improved tipless bushing apparatus.

These and other objects of the invention will become more apparent as the invention is described hereinafter in detail with reference to the accompanying drawings.

DESCRIPTIONS OF THE DRAWINGS

FIG. 1 is a semi-schematic elevational view of a fiber forming apparatus embodying the invention.

FIG. 2 is an enlarged sectional view of the bushing illustrated in FIG. 1.

FIG. 3 is a partial bottom view of the bushing illustrated in FIG. 2.

FIG. 4 is a sectional view of the bottom wall taken along line 4—4 of FIG. 3.

FIG. 5 is a partial bottom view of a bushing in accordance with the invention.

FIG. 6 is a cross-sectional view of the bottom wall taken along line 6—6 of FIG. 5.

FIG. 7 is a cross-sectional view of the bottom wall taken along line 7—7 of FIG. 5.

FIG. 8 is a bottom view of a bushing in accordance with the invention having more than one orifice area.

FIG. 9 is a side view of the bushing of FIG. 8.

DESCRIPTION OF THE PREFERRED EMBODIMENT

It is to be understood that the invention is not limited in its application to the details of construction and arrangement of the parts illustrated in the accompanying drawings, since the invention is capable of other embodiments and of being practiced or carried out in various ways to produce elements for other end uses. Also, it is to be understood that the phraseology employed herein is for the purpose of description and not of limitation.

Referring to the drawings in detail, FIG. 1 illustrates a fiber forming operation. Mineral material, such as glass, is maintained in a molten condition in bushing or stream feeder assembly 10 from which a plurality of streams of heat softened glass is emitted for attenuation into fibers. The bushing is constructed of a platinum/rhodium alloy or other heat resistant material and comprises upwardly extending sidewalls 12 and bottom wall or orifice plate assembly 14. Streams of molten glass are emitted from the orifices in the bottom wall and are attenuated into fibers 16 by winder apparatus 24. The fibers are coated by size applicator 22 and gathered into strand 18 by gathering shoe 19. The strand is reciprocated by traverse 28 as it is collected into package 30 on winder collet 26.

To control the glass fiber forming environment, blower means 20 is provided. Such blower means are described in more detail, for example, in U.S. Pat. Nos. 4,202,680 and 3,905,790, as well as in British Pat. No. 1,498,184.

Bushing assembly 10 is shown in more detail in FIGS. 2 through 4. The bottom wall is shown to have a plurality of orifices for the passage of molten mineral material therethrough. Two sets of parallel grooves, 32 and 34, are formed in the generally flat undersurface of the bottom wall between the orifices. Each set of grooves is in intersecting relationship with the other so as to divide said undersurface into a number of sections 38 within each one of which is located an orifice 36. As shown, the grooves intersect at right angles and the sections are square in shape.

The orifices of the bottom wall are arranged in a highly dense fashion. In the absence of the grooves, the orifices are in a flooding relationship such that the molten glass material flowing through the orifices tends to flood together into a mass of molten glass material covering the undersurface of the bushing during a fiber forming interruption. The orifice density is generally in the range of 75 orifices per square inch (11 orifices per square centimeter) or greater. For example, the orifice density can be in the range of from about 100 orifices per square inch (15 orifices per square centimeter) to about 250 orifices per square inch (39 orifices per square centimeter).

As shown, the grooves have a rectangular cross-section. The grooves are small in cross-sectional area and having sharp outer edges such as right angle corners. The grooves can, for example, have a width in the range of from about 0.005 inch (0.1 mm) to about 0.05 inch 12mm) and a depth in the range of from about 0.005 inch (0.1 mm) to about 0.02 inch (0.5 mm). It is within the scope of the invention that the groove can have other cross-sectional shapes such as square, U shape or V shape.

The grooves are to restrict movement of molten glass material across the undersurface of the bushing between orifices. Molten glass material flowing across the land area surrounding an orifice is resisted from proceeding further when it encounters the sharp edge of a groove. Thus, during operation of such a glass fiber forming apparatus the tendency of such a biasing to flood is reduced.

FIGS. 5 through 7 illustrate another embodiment of the invention. The bottom wall 40 is shown to have two sets of parallel grooves 42 and 44 formed on the undersurface of the tipless bushing. Such parallel grooves are intersecting relationship and circular groove areas 45 are provided at such intersections. Thus, the flat undersurface of the bushing is divided into a number of sections 47 with an orifice in each section. At the circular intersectional groove areas, rod members 46 project outwardly beneath the depth of the groove.

During operation of a glass fiber forming bushing, even with the groove members restricting the flooding of glass material across the undersurface of the bushing, such material still may, upon occasion, flow into such grooves. Upon such an occurrence, the rod members can be used to assist in collecting and removing such molten glass from the groove.

FIGS. 8 and 9 illustrate a glass fiber forming bushing with a plurality of orificed areas. The orifice areas or sections 52 are surrounded by land areas 56. The orifice sections are separated by rib 54 positioned in the land areas. The orifice sections of the bushing can each be identical or be of different orifice densities and groove configurations. The construction of the orifice areas are as described above.

The following examples are included for illustrative purposes only and are not intended to limit the scope of the invention.

EXAMPLE I

In this example, a bushing having 49 orifices was used. Each orifice was 0.035 inch (0.9 mm) in diameter and were spaced at a center-to-center distance of 0.07 inch (1.7 mm). Two sets of parallel grooves were formed on the undersurface of such bushing to divide said undersurface into square sections with one orifice in each section. The grooves had a rectangular shape with a width of 0.025 inch (0.6 mm) and a depth of 0.015 inch (0.38 mm). The orifice density of the bushing was 227 orifices per square inch (34 orifices per square centimeter). Cooling air was directed upwardly against the undersurface of the bushing in an amount and at a velocity sufficient to render the streams attenuable to fibers. Complete filament separation was achieved.

EXAMPLE II

In this example, a bushing having 36 orifices was used. Each orifice had a diameter of 0.035 inch (0.9 mm) and were at center-to-center distances along the plate of 0.09 inch (2.2 mm). Two sets of parallel grooves were formed on the undersurface of the plate. The grooves were in intersecting relationship with one another so as to divide the undersurface into a number of square sections with an orifice located within each section. The grooves had a rectangular shape with a width of 0.045 inch (1.1 mm) and a depth of 0.015 inch (0.38 mm). This orifice area had a density of 147 orifices per square inch (22 orifices per square centimeter). Cooling air was directed upwardly against the undersurface of the bushing in an amount and at a velocity sufficient to render the steams attenuable to fibers. Complete filament separation was achieved.

Having described the invention in detail, it will be understood such specifications are given for the sake of explanation. Various modifications and substitutions, other than those cited, may be made without departing from the scope of the invention as defined in the following claims.

INDUSTRIAL APPLICABILITY

The present invention would be useful in the mineral fiber forming art and, in particular, in the glass fiber forming art.

We claim:

1. An orifice plate for a glass fiber drawing bushing of the type having a flat undersurface and a plurality of orifices formed therethrough, the improvement comprising at least two sets of grooves formed on said undersurface, said grooves extending in intersecting relationship to divide said undersurface into a plurality of sections, said orifices being located within said sections, and a rod member at an intersection of two of said grooves, said rod member projecting outwardly beneath the depth of the intersecting grooves.

2. The orifice plate of claim 1, wherein said respective sets of grooves are arranged to meet at right angles with one another so that said sections are square.

3. The orifice plate of claim 1, wherein said grooves have a rectangular cross-section.

4. The orifice plate of claim 1, wherein the grooves have a width in the range of from about 0.1 mm to about 1.2 mm and a depth in the range of from about 0.1 mm to about 0.5 mm.

5. The orifice plate of claim 1, wherein the orifice density is in the range of from about 100 orifices per square inch (15 orifices per square centimeter) to about 250 orifices per square inch (39 orifices per square centimeter).

6. An orifice plate for a glass fiber drawing bushing of the type in which said orifice plate has a flat undersurface and a large number of orifices so closely arranged that molten glass cones produced at adjacent orifices easily coalesce to cause flooding over said undersurface and cooling air is required to be blown against said undersurface of the orifice plate to prevent flooding, the improvement comprising at least two sets of parallel grooves formed on said undersurface, said sets of grooves extending in intersecting relationship to divide said undersurface into a plurality of sections, said orifices being located within said sections, and a rod member at an intersection of two of said grooves, said rod member projecting beyond the flat undersurface.

7. A plate as claimed in claim 6, wherein said respective sets of grooves are arranged to meet at right angles with one another so that said sections are square.

8. The orifice plate of claim 6, wherein the grooves have a width in the range of from about 0.1 mm to about 1.2 mm and a depth in the range of from about 0.1 mm to about 0.5 mm.

9. The orifice plate of claim 6, wherein the orifice density is in the range of from about 100 orifices per square inch (15 orifices per square centimeter) to about 250 orifices per square inch (39 orifices per square centimeter).

* * * * *